United States Patent [19]
Chevalier et al.

[11] Patent Number: 5,894,722
[45] Date of Patent: Apr. 20, 1999

[54] VARIABLE GEOMETRY RAMJET FOR AIRCRAFT

[75] Inventors: Alain Chevalier, Asnieres-les-Bourges; Marc Bouchez, Bourges, both of France

[73] Assignee: Aerospatiale Societe Nationale Industrielle, Paris, France

[21] Appl. No.: 08/808,574

[22] Filed: Feb. 28, 1997

[30] Foreign Application Priority Data

Mar. 1, 1996 [FR] France .................... 96 02603

[51] Int. Cl.$^6$ .................................. F02K 7/10
[52] U.S. Cl. .......................... 60/270.1; 60/262
[58] Field of Search ............... 60/225, 244, 245, 60/262, 270.1

[56] References Cited

U.S. PATENT DOCUMENTS

| | | |
|---|---|---|
| 3,143,852 | 8/1964 | Alderson . |
| 3,279,194 | 10/1966 | Chapman . |
| 3,432,100 | 3/1969 | Hardy et al. .................. 60/244 |
| 5,054,288 | 10/1991 | Salemann .................. 60/270.1 |

FOREIGN PATENT DOCUMENTS

| | | |
|---|---|---|
| 1110011 | 2/1956 | France . |
| 2222635 | 3/1990 | United Kingdom . |

*Primary Examiner*—Louis J. Casaregola
*Attorney, Agent, or Firm*—Stevens, Davis, Miller & Mosher, L.L.P.

[57] ABSTRACT

A ramjet for supersonic and/or hypersonic aircraft, designed to operate over a wide range of speeds, includes an inlet for a combustion supporting gas; a fuel injection device; and a ramjet body. The ramjet body has a combustion chamber in which the combustion supporting gas is mixed with a fuel to be burned and an exhaust nozzle to channel gases leaving the combustion chamber and which has, at least in a transition area between the combustion chamber and the exhaust nozzle, a variable geometry enabling its longitudinal section to be progressively modified. The ramjet body has at least one controllable opening adapted to establish communication between the combustion chamber and the exterior to enable the introduction of an exterior air stream into the transition area.

8 Claims, 2 Drawing Sheets

VARIABLE GEOMETRY RAMJET FOR AIRCRAFT

BACKGROUND OF THE INVENTION

1. Field of the Invention

The present invention concerns a ramjet for supersonic and/or hypersonic aircraft designed to operate over a wide range of speeds, for example Mach numbers between 1–2 and 15–20.

2. Description of the Prior Art

French patent application 95 08417 describes a ramjet able to operate over a range of speeds in this order whilst retaining maximum efficiency. To this end, it comprises:

a combustion supporting gas inlet;

a fuel injection device; and a ramjet body which comprises a combustion chamber in which the combustion supporting gas is mixed with a fuel to be burned and an exhaust nozzle to channel the gases leaving the combustion chamber and which has, at least in a transition area between the combustion chamber and the exhaust nozzle, a variable geometry progressively varying from a convergent then divergent longitudinal section for speeds corresponding to a low Mach number to an approximately constant and then divergent longitudinal section for speeds corresponding to a high Mach number.

A variable geometry of the longitudinal section of the body is obtained, in the embodiment described in the above patent application, by having one of the lateral walls of the body in the form of plates hinged together about axes transverse to the longitudinal direction of the ramjet at least in the transition area (nozzle throat). Accordingly, depending on the selected airspeed, the geometry of the longitudinal section of the body can be varied, in particular in the transition area, by moving the plates progressively into the appropriate position, which enables optimal flight conditions to be conserved for the indicated range of speeds, in particular a maximal thrust value independent of external conditions (fuel consumption, aerodynamic pressure, profile of the flow of combustion supporting gas in the corresponding inlet). In other words, this amounts to "eliminating" the nozzle throat (convergent-divergent geometry) that exists at "low" speeds so as finally to obtain (at a Mach number equal to or greater than around 7) a constant section of the combustion chamber followed by the divergent section of the exhaust nozzle.

Although technically operational, this embodiment of the variable geometry of the body can give rise to problems with correct operation at the hinges of the plates, from the point of view of reliability under extreme conditions, in particular of temperature. Air blower means may then be provided to eliminate these drawbacks. What is more, the set of hinged plates and the blower means, if used, help to increase the mass of the ramjet, which is undesirable.

An object of the present invention is to propose a ramjet in which the design of the variable geometry of the body eliminates the problems referred to hereinabove.

SUMMARY OF THE INVENTION

To this end, the ramjet of the type defined above is noteworthy, in accordance with the invention, in that said ramjet body comprises at least one controllable opening adapted to establish communication between said combustion chamber and the exterior enabling the introduction of an exterior air stream into said transition area.

Accordingly, in accordance with the invention, the variable geometry of the body is obtained by the introduction of said exterior air stream into the transition area of the ramjet, without using mechanical components as in the prior art. This stream, which forms a flow of air at low temperature and at low pressure, is used to modify, in particular at the level of the transition area (nozzle throat), the longitudinal flow section of the combustion supporting gas and fuel gas mixture at a high temperature and at a high pressure flowing in the body, when it is introduced into the latter. In this way this stream reduces the flow section of the gas mixture by conforming it appropriately. Depending on the airspeed of the aircraft, the quantity of exterior air admitted into the body of the ramjet is varied by means of the controllable opening to conserve optimal flight conditions.

What is more, this variable geometry solution using an air stream helps to reduce the thermal stresses occurring at the level of the nozzle in particular and to reduce the mass of the ramjet, compared to the prior art solution.

For example, said opening is formed in a wall of said body and a controllable flap is hinged to said wall about an axis to close off said opening when it occupies a closed position and to enable said air stream to flow from the exterior to the interior of said body, through said opening, when it occupies any open position.

The general shape of the ramjet body is that of a rectangular cross-section duct made up of walls in opposite pairs. In this case, said opening is provided in the bottom wall or intrados of said body. The top wall is then associated with the fuselage of the aircraft.

The hinge axis of said flap is substantially orthogonal to the longitudinal direction of said body. In a first embodiment, said controllable flap may be hinged by its leading edge to said wall about said axis, said flap pivoting towards the interior of said body to allow said exterior air stream to enter the latter. In a second embodiment, said controllable flap is hinged to said wall at its trailing edge about said axis, said flap pivoting towards the exterior of said body to allow said exterior air stream to enter the latter.

Two controllable openings may be provided in said body, a first communicating with said combustion chamber and a second communicating with said transition area. Flaps controlling said openings are hinged to a wall of said body about respective axes. In this way the second opening may be used to introduce an air stream into the transition area for low Mach numbers. The first opening is used at higher Mach numbers to conform the geometry of the longitudinal section of said body appropriately.

The figures of the accompanying drawings show clearly how the invention may be put into effect. In the figures, identical reference numbers designate similar components.

DETAILED DESCRIPTION OF THE PREFERRED EMBODIMENTS

Figure 1:
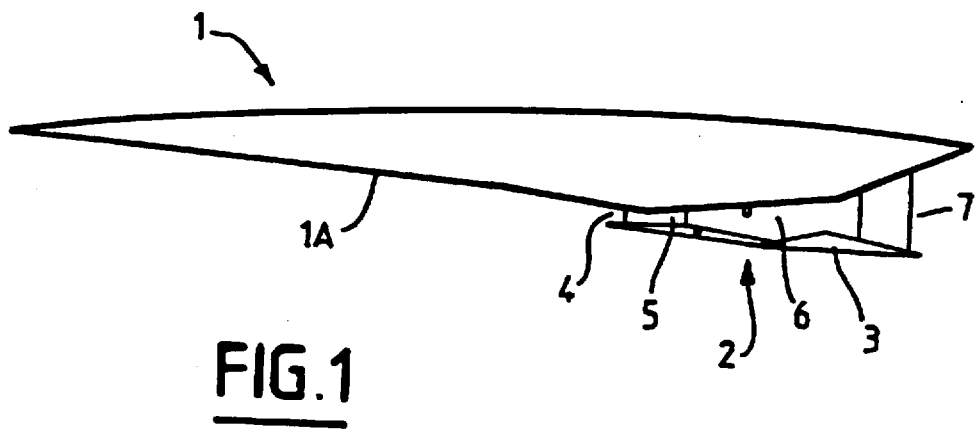
FIG. 1 shows diagrammatically an aircraft equipped with a ramjet of the invention.

The aircraft 1 shown in FIG. 1 is equipped, under its fuselage 1A in this embodiment, with a variable geometry ramjet enabling it to fly at a wide range of speeds between Mach numbers of 1–2 and 15–20.

The ramjet 2 mainly comprises a structure body 3, a combustion supporting gas inlet 4, a fuel injection device 5, a combustion chamber 6 and an exhaust nozzle 7. In the example shown in FIG. 2 the structure body 3 has a longitudinal shape approximating a duct of rectangular or like cross-section made up of opposite pairs of walls. In the example shown the top wall 3A is associated with the fuselage 1A of the aircraft and the bottom wall 3B constitutes the lower surface of the ramjet. The other two, lateral walls 3C are parallel to the plane of the figures.

From the upstream to the downstream end of the ramjet body, in its longitudinal direction, in the direction of flow of the gas jet or mixture symbolically represented by the arrow F, there are the combustion supporting gas inlet 4, for example an air inlet, the injection device 5 aft of said inlet, a combustion chamber 6 in which the combustion supporting gas is mixed with the fuel to be burned, and an exhaust nozzle 7 having a convergent-divergent geometry throat 8 adapted to channel towards the exterior the gas jet produced by the mixture.

What is more, the body 3 of the ramjet 2 has a variable geometry at least in a transition area 9 defined between a part of the combustion chamber 6 and a part of the nozzle (throat) and enabling, as previously indicated, the longitudinal section of the body 3 to be modified according to the airspeed, at least in this transition area 9 (throat 8).

Furthermore, the combustion chamber 6 is divided into an upstream diffusion area in which supersonic combustion commences and a downstream chamber area in which supersonic combustion occurs, aft of said retractable flame catchers 10, and where supersonic combustion terminates. The injection device 5, made up of injectors, distributes the fuel into all of the volume of the chamber. As for the fuel to be used to suit the required Mach number, reference should be had to the previously cited French patent application.

Figure 2:
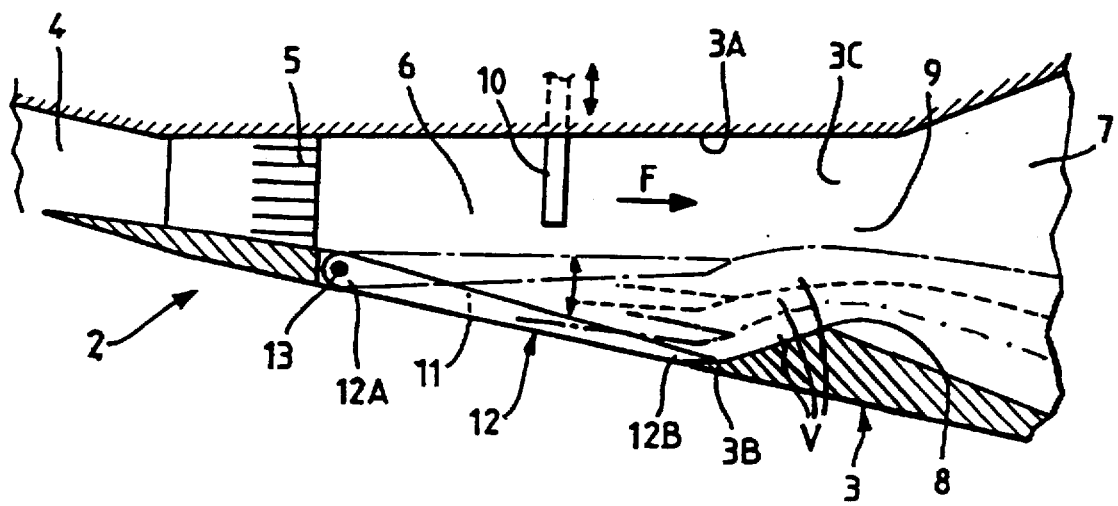
FIG. 2 shows one embodiment of said varying geometry ramjet of the invention in diagrammatic longitudinal section.

In accordance with the invention, the structure body 3 of the ramjet 2 is provided, in the embodiment shown in FIG. 2, with a controllable opening 11 formed in this case in the bottom wall 3B of the body and which is adapted to establish communication between said combustion chamber 6 and the exterior in order, when it is operational, to introduce an exterior air stream into the transition area 9 of the body, flowing in the same direction F as the gas jet. This air stream V then varies the geometry of the longitudinal section of the body, in particular at the level of the transition area, and consequently modifies the flow section of the gas jet passing through the interior of the structure body, as will be explained hereinafter.

In particular, a flap 12 forming a retractable trap closes off the opening 11 so that it can be uncovered progressively. The flap 12 is hinged to the bottom wall 3B of the body about a pin 13 and it is pivoted by an actuator that is not shown but is of a type known in itself. In this example, the hinge pin 13, which is orthogonal to the longitudinal direction of the ramjet, is provided on the leading edge 12A of the flap, which faces towards the injection device 5, whereas its trailing edge 12B faces towards the transition area. In the closed position of the flap 12, shown in continuous line in FIG. 2, for which the opening 11 is totally closed off, the flap 12 extends the wall 3B with no discontinuity and thus forms part of the wall.

This closed position of the flap 12 (shown in full line) corresponding to an airspeed in the range Mach 1–2 for which the volume (or the height) of the combustion chamber 6 is maximal (maximal flow cross-section), the ramjet 1 terminating in a nozzle 7 with a convergent-divergent geometry open throat.

For an airspeed in the order of Mach 2.5 the flap 12 occupies the position shown in bold chain-dotted line in FIG. 2, being withdrawn into the interior of the combustion chamber 6 of the body 3 by the actuator and by virtue of the hinge pin 13. The flap 12 uncovers the opening 11 which constitutes an air inlet and through which an exterior air stream V is introduced. Channelled by the flap 12, the latter flows towards the transition area 9, obliging the gas jet obtained from the combustion supporting gas and fuel mixture to assume a smaller cross-section configuration along the longitudinal section from the flap 12, which also contributes to the configuration of the new geometry of the gas jet, as far as the outlet of the nozzle 7. In this position, the geometry of the chamber 6 changes slightly, its cross-section decreasing and that of the nozzle 7 substantially retaining a convergent-divergent throat 8, in particular at the level of the transition area 9. The exterior air stream V, which is at low temperature and low pressure, therefore serves as a "natural boundary" for varying the geometry of the structure body, i.e. the gas jet at high temperature and high pressure.

For an airspeed of Mach 6, for example, the flap 12 occupies the position shown in dashed line in FIG. 2; because the flap has moved further inside the body, the cross-section of the combustion chamber 6 is reduced accordingly, tending to be almost constant, while the nozzle 7 retains a convergent-divergent throat geometry but is definitely flatter, because of the flow of the more substantial air stream V introduced into the body.

For details of the operation of the flame catchers 10 and the fuel injection device 5 at these various and other speeds reference should be made to the previously cited French patent application.

For an airspeed greater than Mach 7, for example, the flap 12 occupies the position shown in fine chain-dotted line, for which the geometry of the longitudinal section of the body 3 has a substantially constant cross-section from the combustion chamber 6 as far as the throat 8 of the nozzle 7, which is now purely divergent. The flap 12 is substantially parallel to the top wall 3A of the body and the maximal size opening 11 allows a substantial air stream V to enter the transition area 9, said stream extending the plane of the flap 12 and maintaining the longitudinal section constant, to the point where it diverges slightly aft of the nozzle throat. This configuration is used with advantage when operating conditions are such that the input of heat by combustion can be effected under supersonic conditions, without a thermal blocking phenomenon occurring in the resulting substantially constant section (it is this which determines whether it is Mach 7 or more or less).

Although this variable geometry of the structure body 3 of said ramjet, by virtue of the introduction of an air stream, enables the various flight phases of the aircraft to be optimized over a wide range of Mach numbers and flight conditions (altitude, angle of incidence, acceleration or cruising speed), it also has other noteworthy advantages.

This additional air stream constitutes an additional quantity of motion, increasing the flowrate in the body, which can be beneficial to the thrust of the ramjet without necessarily increasing consumption. Also, the drag of the ramjet is reduced so that the friction on the bottom wall of the structure body is reduced, this friction having an important influence on the performance as the Mach number increases. Additionally, the lower or bottom part of the nozzle is advantageously cooled by the flow of the low temperature air stream, so that only the top wall is subject to intense heat flow. Note also that the dilution of the gas jet obtained at the outlet from the nozzle may be beneficial by reducing the radar signature.

Figure 3:
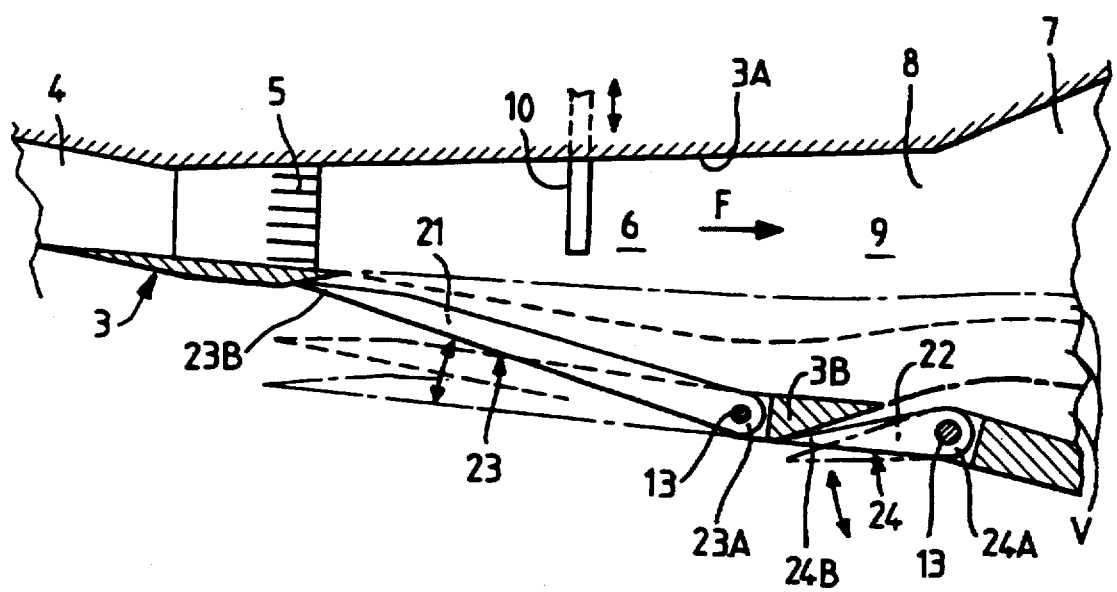
FIG. 3 shows a different embodiment of said ramjet in diagrammatic longitudinal section.

In the embodiment shown in FIG. 3, the geometry of the structure body 3 is varied by means of two openings 21, 22 formed in series in the bottom wall 3B of the body and adapted to be closed off by respective controllable flaps 23 and 24. To be more precise, the first opening 21 communicates with the combustion chamber 6 and the second opening 22 opens directly into the transition area 9 at the level of the throat 8 of the nozzle 7, in the convergent part of its geometry.

Differing in this respect from the previous embodiment, the flap 23 of the first opening 21 is hinged by its trailing edge 23A to the bottom wall 3B about a hinge pin 13 so that its leading edge 23B pivots to uncover progressively the first opening 21. The same goes for the flap 24 of the second opening, hinged by its trailing edge 24A to the wall of the nozzle throat about a pin 13. The two flaps are again operated by actuators that are not shown and the hinge pins 13 are parallel to each other and orthogonal to the longitudinal direction of the ramjet.

The operation of this embodiment is similar to that described with reference to FIG. 2.

For airspeeds in the order of Mach 2.5 only the flap 24 is actuated, to uncover the second opening 22 to a degree appropriate to this speed and to cause an exterior air stream V represented by a bold chain-dotted line to enter directly into the throat 8 of the nozzle 7, so as to modify the gas jet produced by combustion at this location in the transition area 9. The flap 23 closes off the first opening 21.

For airspeeds in the order of Mach 6 and greater than Mach 7, for example, the flap 23 is opened respectively to the position shown by a dashed line and by a fine chain-dotted line, and allows an exterior air stream to enter via the opening 21 and travel through the combustion chamber 6 and the transition area 9 and to exit via the nozzle 7. For an airspeed of at least Mach 7, the variable geometry of the body 3 is substantially constant as far as the throat 8 of the nozzle 7 and thereafter slightly divergent. As the speed increases, the volume of the combustion chamber and of the transition area decreases until the volume occupied is minimal at Mach numbers greater than 7, for example.

There is claimed:

1. A ramjet for supersonic and/or hypersonic aircraft, designed to operate over a wide range of speeds, comprising:

an inlet for a combustion supporting gas;

a fuel injection device; and a ramjet body which comprises a combustion chamber in which said combustion supporting gas is mixed with a fuel to be burned and an exhaust nozzle to channel gases leaving said combustion chamber and which has, at least in a transition area between said combustion chamber and said exhaust nozzle, a variable geometry progressively varying from a divergent then convergent longitudinal section for speeds corresponding to a low Mach number to an approximately constant and then divergent longitudinal section for speeds corresponding to a high Mach number, wherein said ramjet body comprises at least one controllable opening adapted to establish communication between said combustion chamber and the exterior to enable the introduction of an exterior air stream into said transition area.

2. The ramjet claimed in claim 1 wherein said opening is formed in a wall of said body and a controllable flap is hinged to said wall about an axis to close off said opening when it occupies a closed position and to enable said exterior air stream to flow into the interior of said body through said opening when it occupies any open position.

3. The ramjet claimed in claim 2 wherein said body has the general shape of a rectangular cross-section duct made up of opposite pairs of walls and said opening is provided in a bottom wall or lower surface of said body.

4. The ramjet claimed in claim 2 wherein said hinge axis of said flap is substantially orthogonal to a longitudinal direction of said body.

5. The ramjet claimed in claim 2 wherein said controllable flap is hinged to said wall about said axis at its leading edge and pivots towards the interior of said body to allow said exterior air stream to enter thereinto.

6. The ramjet claimed in claim 2 wherein said controllable flap is hinged to said wall about said axis at its trailing edge and pivots towards the exterior of said body to allow said exterior air stream to enter thereinto.

7. The ramjet claimed in claim 1 wherein two controllable openings are formed in said body, a first of them communicating with said combustion chamber and a second of them communicating with said transition area.

8. The ramjet claimed in claim 7 wherein flaps control said openings and are hinged to a wall of said body about respective axes.

* * * * *